United States Patent
Kuo

(10) Patent No.: US 7,395,589 B1
(45) Date of Patent: Jul. 8, 2008

(54) ROTATIONAL POWER SERVO TOOLPOST

(76) Inventor: Ching-Hui Kuo, No. 149-1, Jusen Village, Tornluo Shiang, Maio-Li County (TW)

( * ) Notice: Subject to any disclaimer, the term of this patent is extended or adjusted under 35 U.S.C. 154(b) by 0 days.

(21) Appl. No.: 11/626,912

(22) Filed: Jan. 25, 2007

(51) Int. Cl.
*B23B 29/32* (2006.01)

(52) U.S. Cl. .................. 29/40; 29/39; 29/33 J; 82/120; 82/121; 409/16

(58) Field of Classification Search .................. 29/35.5, 29/36, 39, 40; 82/117, 121; 409/11, 16, 409/15
See application file for complete search history.

(56) References Cited

U.S. PATENT DOCUMENTS

| | | | |
|---|---|---|---|
| 4,872,244 A * | 10/1989 | Schleich | 29/40 |
| 5,632,075 A * | 5/1997 | De Bernardi et al. | 29/40 |
| 6,785,943 B2 * | 9/2004 | Sheehan et al. | 29/40 |
| 6,931,972 B2 * | 8/2005 | Sahm et al. | 82/121 |
| 7,305,745 B2 * | 12/2007 | Shibui | 29/40 |

* cited by examiner

*Primary Examiner*—Monica S. Carter
*Assistant Examiner*—Sara Addisu

(57) ABSTRACT

A rotational power servo toolpost includes a plurality of rotational tool holders, which can freely rotate 360 degrees, to cut a workpiece from various angles. The rotational power servo toolpost has a turret base, a turret, tool holders mounted on a side surface of the turret and having a variety of needed tools, a tool-holder-rotating device, and a tool-rotating device. When the tool holder with the needed tool rotates along with the turret to the preset area, a servo motor of the tool-holder-rotating device drives the related members to freely rotate the tool holder around 360 degrees according to the machining requirements. The tool-driving device then drives the tool, thereby cutting the workpiece from various angles.

4 Claims, 3 Drawing Sheets

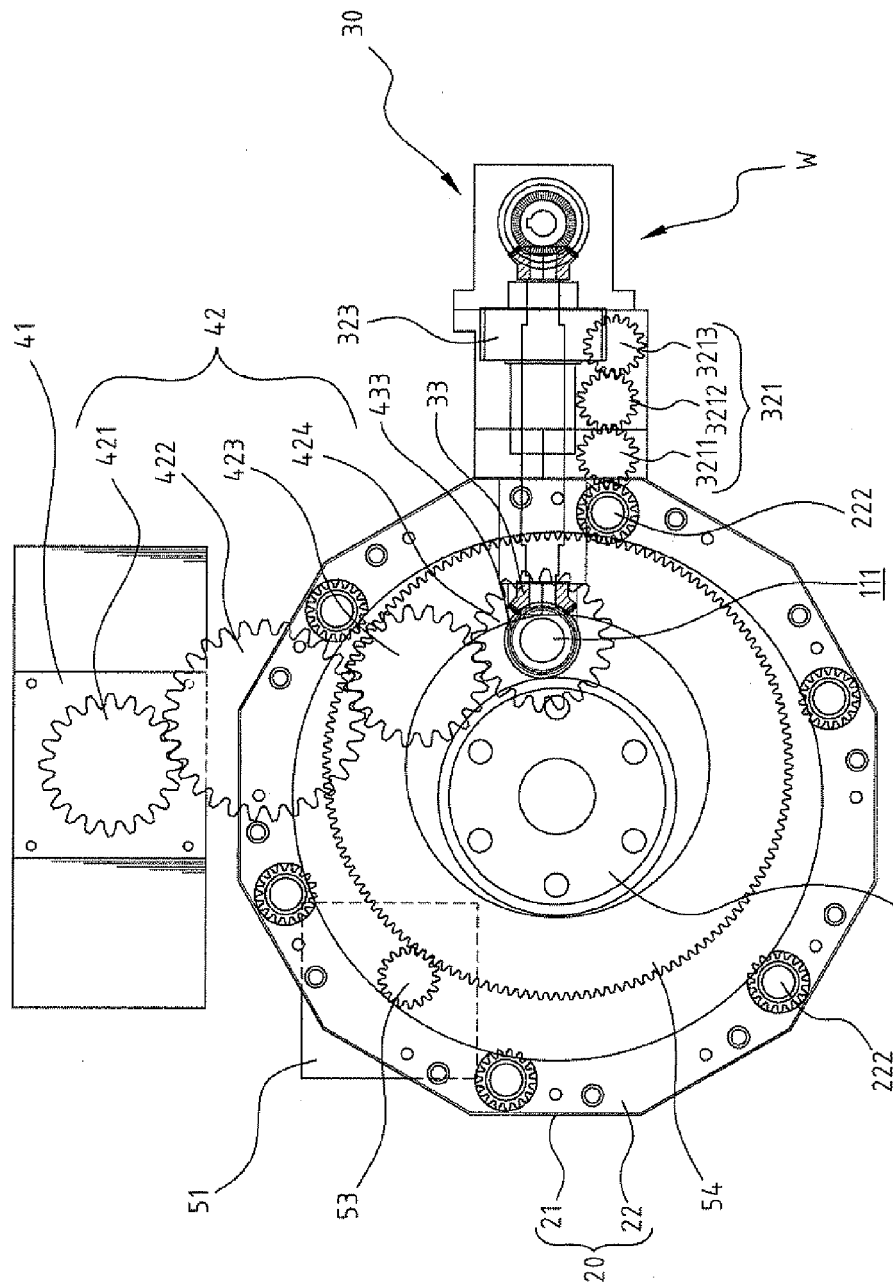

ROTATIONAL POWER SERVO TOOLPOST

BACKGROUND OF THE INVENTION

1. Field of the Invention

The present invention relates generally to a toolpost of a lathe, and in particular to a rotational power servo toolpost that includes a plurality of tool holders, which can freely rotate 360 degrees to machine a workpiece from various angles.

2. The Prior Arts

CNC lathe is a powerful machine to perform various operations such as cutting, sanding, or drilling with precision. The CNC lathe uses a variety of cutting tools, such as a lathe tool, a milling cutter, a thread cutter, etc to cut the workpiece, and a computer controller reads instructions and drives the machine tools to fabricate components by the selective removal of metal or other materials.

During machining, a variety of cutting tools cut a workpiece, so it needs to change tools frequently to carry out machining. Therefore, a turret, which includes a plurality of tool holders holding a range of tools and is driven to rotate by a motor, is developed. When one of the tools finishes cutting, the turret rotates to a preset angle so that another tool moves into the work area to continue the work. The motor driven turret can rotate to change working tools as needed at any time, thereby improving working efficiency. However, the conventional turret has a disadvantage that the tool holders are fixed on the turret. Although the turret rotates to a preset location, the tool holder that holds the tool is fixed on the turret and can not rotate. Therefore, the tools can cut the workpiece only from one direction. That is to say, the cutting range of the tool is limited, which greatly reduces the practicability and the convenience of the machine. Therefore, a toolpost comprising a turret, a plurality of tool holders pivotally mounted on a side surface of the turret, and a rotating mechanism to rotate the tool holders can increase the cutting range, thereby improving the conventional turret.

SUMMARY OF THE INVENTION

A conventional motor-driven turret includes tool holders fixed thereon. The tool holders move along with the rotated turret to a preset location, but can not spin themselves. Thus the cutting range is limited and the working efficiency is reduced. A primary objective of the present invention is to overcome the disadvantage of the conventional turret. The present invention provides a rotational power servo toolpost that can freely rotate 360 degrees. When the turret of the toolpost rotates to the preset angle, the tool holder within the work area can rotate to a specific working angle, thereby increasing the working range and cutting methods. Therefore, the lathe can be more omni-directional to machine the workpiece, thereby increasing the practicability and convenience.

In order to achieve the objective mentioned above, the present invention provides a rotational power servo toolpost, which includes a turret base, a turret, a plurality of tool holders having needed tools, a tool-holder-rotating device, and a tool-rotating device. At least one tool holder is mounted on a side surface of the turret, and each tool holder is provided with a variety of tools respectively. The tool holder is inserted into a mounting hole at the side surface of the turret, and provided with a connection set. The turret comprises a turret main body and a retaining ring. The retaining ring is pivotally connected with a plurality of driven gears, which connect with the connection set. The driven gears are also pivotally connected with the turret main body. Thus, the driven gears can rotate between the turret main body and the retaining ring. Moreover, the driven gears are also pivotally mounted in the mounting holes. When a tool holder rotates with the turret into the preset work area, a servomotor of the tool-holder-rotating device drives a transmission pole, which connects with the servomotor and is inserted into the turret. The transmission pole drives a transmission gear connected therewith. The transmission gear engages with and drives a ring gear. The ring gear is eccentrically disposed to engage with one of the driven gears, thereby driving the driven gear within the work area. The driven gear connects with the connection set of the tool holder, thereby rotating the tool holder within the work area. At the same time, a tool-rotating device can drive the needed tool to rotate. The tool-rotating device comprises a driving motor, a tool-rotating gear set connected with the driving motor, a driving pole inserted into the turret and connected with the tool-rotating gears set, and a bevel gear connected with the driving pole and engaged with a driving gear, whereby the driving gear connects with and rotates the tool to carry out cutting work. Therefore, the tool holder and tool within the work area can freely rotate according to the processing requirements and the tool is omni-directional to cut the workpiece.

When a tool holder moves with the turret into the preset work area, the tool holder and tools can freely rotate, thereby cutting the workpiece from various angles. The cutting range and the cutting methods are increased. The efficiency and the practicability of a lathe equipped with the rotational power servo toolpost according to the present invention are also increased. Because the turret may be provided with a plurality of tool holders having a variety of tools, it is easy to change the needed tool without manually changing tools during the cutting operation. It saves working time and increases an industrial yield.

BRIEF DESCRIPTION OF THE DRAWINGS

The present invention will be apparent to those skilled in the art by reading the following detailed description of a preferred embodiment thereof, with reference to the attached drawings, in which:

FIG. 3 is a schematic view showing a working state of the rotational power servo toolpost according to the present invention.

DETAILED DESCRIPTION OF THE PREFERRED EMBODIMENT

Figure 1:
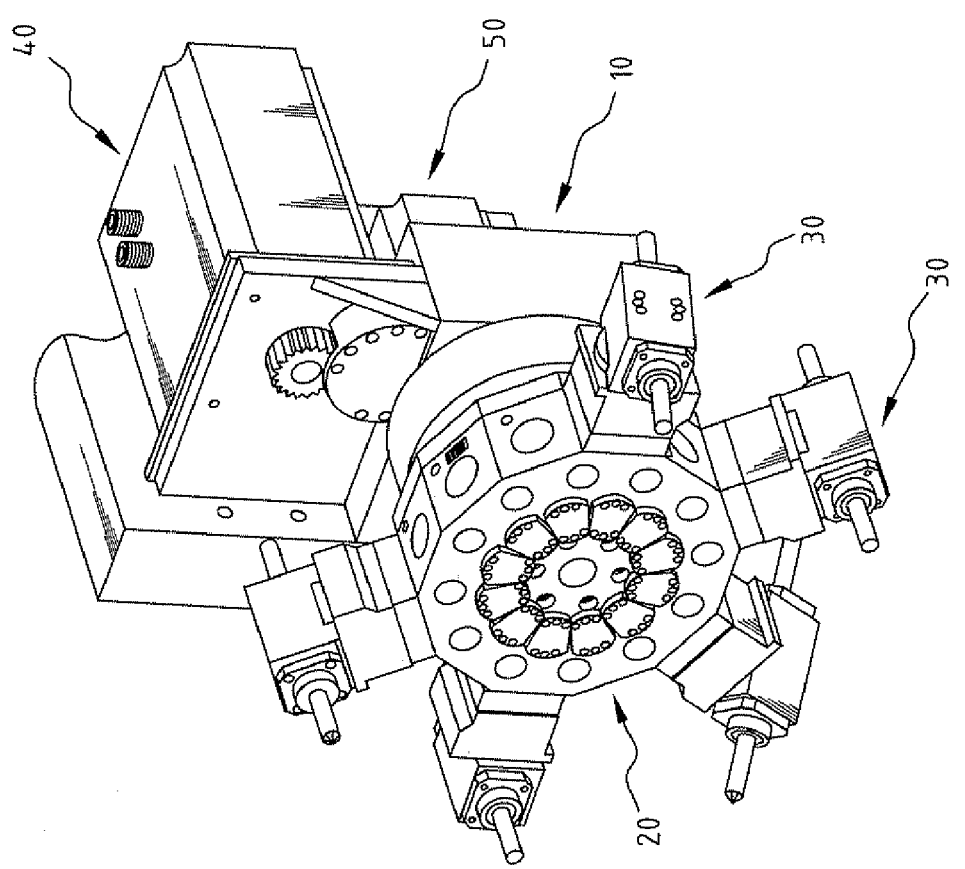
FIG. 1 is a perspective view showing a rotational power servo toolpost according to the present invention.
Figure 2:
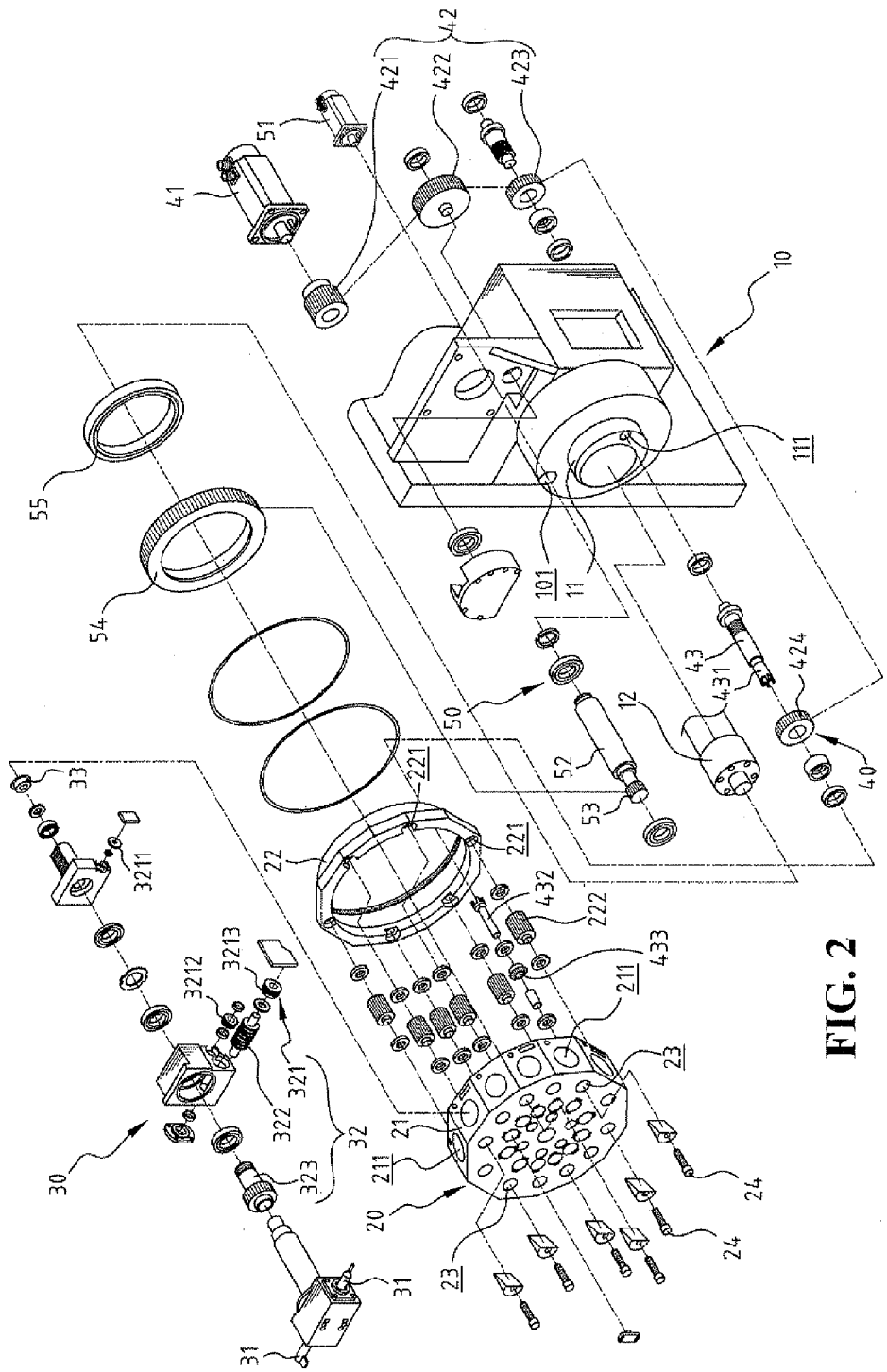
FIG. 2 is an exploded view showing the rotational power servo toolpost according to the present invention.

Referring to FIGS. 1 and 2, a rotational power servo toolpost according to the present invention includes a turret base 10, a turret 20, at least one tool holder 30, a tool-rotating device 40 and a tool-holder-rotating device 50. Each tool holder 30 is mounted on a side surface of the turret 20, and provided with a variety of needed tools 31. Referring to FIG. 3, a tool holder 30 moves with the rotated turret 20 to a preset work area W. A servomotor 51 of the tool-holder-rotating device 50 drives related members to make the tool holder 30 within the work area W to freely rotate 360 degrees. A driving motor 41 of the tool-rotating device 40 drives related members to make the tool 31 of the tool holder 30 to freely rotate 360 degrees, thereby omni-directionally cutting the workpiece.

The turret base 10 is provided with a protruding joint part 11. One end of a pivot shaft 12 is pivotally connected with the protruding joint part 11, and the other end of the pivot shaft 12 is connected to a central part of the turret 20 to rotate the turret 20. Referring to FIG. 3, the protruding joint part 11 eccentrically toward the work area W is provided with a first through hole 111 to hold related members of the tool-rotating device 40, thereby rotating the tool 31 within the preset work area. The turret base 10 is provided with a second through hole 101 to hold related members of the tool-holder-rotating device 50, thereby rotating the tool holder 30. Thus, both the tool holders 30 and the tools 31 can freely rotate to carry out cutting work from various angles.

The turret 20 is pivotally connected with the turret base 10 by the pivot shaft 12. The pivot shaft 12 connects with a motor (not shown in figures) to rotate the turret 20. The turret 20 comprises a turret main body 21 and a retaining ring 22. A side surface of the turret main body 21 comprises a plurality of mounting holes 211 to hold a plurality of tool holders 30 having a variety of tools 31. An end surface of the turret main body 21 is provided with a plurality of retaining holes 23 corresponding to the mounting hole 211. Retaining pieces 24 are inserted into the corresponding retaining holes 23 to secure the tool holders 30 held by the mounting holes 211. The retaining ring 22 comprises a plurality of assembling holes 221 corresponding to the mounting holes 211. The turret 20 is further provided with a plurality of driven gears 222. One end of the driven gear 222 is pivotally mounted into the assembling holes 221 of the retaining ring 22, and the other end of the driven gear 222 is pivotally mounted into the mounting hole 211 of the turret main body 21. Thus, the driven gears 222 can rotate between the turret main body 21 and the retaining ring 22. Moreover, the turret 20 may be shaped in a polygon or other shapes as long as the tool holders 30 conveniently mounted thereon do not interfere with each other. The shape of the turret 20 is not limited to that of the preferred embodiment.

The tool holders 30 are mounted into the mounting holes 211 of the turret 20, and each tool holders may include a variety of tools 31 according to the needed operations to carry out cutting. Each of the tool holders 30 includes a connection set 32 and a driving gear 33. The connection set 32 comprises a connection gear set 321, a worm 322 and a worm wheel 323. The connection gear set 321 includes a first connection gear 3211, a second connection gear 3212 and a third connection gear 3213 engaging each other. The driven gear 222 engages with and drives the first connection gear 3211. The third connection gear 3213 engages with and drives the worm 322. The worm 322 meshes with and drives the worm wheel 323 to rotate. The tool holder 30 comprises a plurality of holes corresponding to the worm wheel 323 to fix the worm wheel 323 on the tool holder 30. Thus the worm 322 drives the worm wheel 323, and then the worm wheel 323 rotates the tool holder 30. When the power is on, the driven gear 222 drives the connection set 32, the worm 322 drives the worm wheel 323, and then the worm wheel 323 may freely rotate the tool holders about 360 degrees. The driving gear 33 connects with and drives the tools 31 to rotate. When the tool holder 30 rotates along with the turret 20 to the work area W, the tool-rotating device 40 drives the tool 31 to rotate, thereby cutting the workpiece from various angles. The number of the connection gears of the connection gear set 321 and how the related members are connected are not limited to those of the preferred embodiment. Any mechanisms that can rotate the tool holders 30 and the tools 31 are applicable to the present invention.

The tool-rotating device 40 mounted on the turret base 10 drives the related members to rotate the tools 31. The tool-rotating device 40 comprises a driving motor 41 whose shaft is pivotally connected with a tool-rotating gear set 42. An end of a driving pole 43 passes through the first through hole 111, and connects with the tool-rotating gear set 42; the other end of the driving pole 43 is provided with an interlocking section 431 and is inserted into the turret 20. One end of a corresponding interlocking rod 432 connects with the interlocking section 431, and the other end of the interlocking rod 432 connects with a bevel gear 433. Because the first through hole 111 is disposed at a side of the tool base 10 toward the work area W, the bevel gear 433 engages with the driving gear 33 of the tool holder 30 that is rotated into the work area W. When the tool holder 30 having the needed tool 31 is rotated into the work area W, the driving motor 41 drives the tool-rotating gear set 42, the tool-rotating gear set 42 drives the driving pole 43, the driving pole 43 drives the bevel gear 433, the bevel gear 433 drives the driving gear 33, and the driving gear 33 drives the tool 31 in turn. Therefore, the tool 31 is rotated to various angles to carry out cutting work. Furthermore, the tool-rotating gear set 42 comprises four gears 421, 422, 423 and 424 engaging with each other. The gear 424 connects with the driving pole 43. The driving pole 43 then drives the bevel gear 433 connected therewith. The bevel gear 433 meshes with driving gear 33 to rotate tool 31. The number of the gears of the gear set 42 and the connection mechanism are not limited to those of the preferred embodiment. Any mechanisms that can rotate the tools 31 are applicable to the present invention.

The tool-holder-rotating device 50 mounted on the turret base 10 rotates the tool holders 30, which is rotated into the work area W. The tool-holder-rotating device 50 comprises a servomotor 51, a transmission pole 52, a transmission gear 53 and a ring gear 54. One end of the transmission pole 52 passes through the second through hole 101 of the turret base 10 and connected with the servomotor 51; the other end of the transmission pole 52 is inserted into the turret 20 and connects with the transmission gear 53. The transmission gear 53 engages with the ring gear 54, and the ring gear 54 is eccentrically disposed to engage with one of the driven gears 222. The driven gear 222 connects with the connection set 32 of the tool holder 30 to rotate the tool holder 30 within the work area W. Therefore, the servomotor 51 drives the transmission pole 52; the transmission pole 52 drives the transmission gear 53; the transmission gear 53 drives the ring gear 54; the ring gear 54 drives the driven gear 222; the driven gear 222 drives the connection set 32; and the connection set rotates the tool holder 30 within the work area W. Thus, the tool holder 30 can approach the workpiece from various angles according to the requirements of processing.

Referring to FIGS. 2 and 3, when assembling the toolpost, the power sources, the driving motor 41 and the servomotor 51, are firstly mounted on the turret base 10, and then the related members are assembled. With regard to assembling the tool-rotating device 40, the tool-rotating gear set 42 connects with the shaft of the driving motor 41; the gears 421, 422, 423 and 424 of the tool-rotating gear set 42 are arranged in a way that the gears 421, 422, 423 and 424 engage with each other; one end of the driving pole 43 passes through the first through hole 111 and connects with the gear 424; the other end of the driving pole 43 is inserted into the turret 20, and the interlocking section 431 of the driving pole 43 connects with the interlocking rod 432; the interlocking rod 432 connects with the bevel gear 433; the bevel gear 433 further engages with the driving gear 33 connected with the tool 31, whereby the driving motor 41 drives the related members to rotate the tool 31 within the work area W. Regarding to assembling the tool-holder-rotating device 50, one end of the transmission pole 52 passes through the second through hole 101 of the turret base 110 and connects with the shaft of the servomotor 51; the other end of the transmission pole 52 is inserted into the turret 20 and connects with the transmission gear 53; the protruding joint part 11 is inserted into a bearing 55, and then the bearing 55 is inserted into the ring gear 54, whereby the transmission gear 53 engages with the ring gear 54; because the ring gear 54 is disposed eccentrically toward the work area W, the ring gear 54 only engages with the driven gear 222 that is within the work area W; the driven gears 222 within the work area W connects with the connection set 32 in the tool holder 30. Therefore, the tool holder 30 can freely rotate to a needed angle and the tool 31 can freely rotate to approach the workpiece from various orientations to carry out cutting work.

After that, a plurality of tool holders 30 having various tools 31 are mounted onto the side surface of the turret 20. When the tool holder 30 having the needed tools 31 is rotated to the work area W along with the turret 20, the servomotor 51 drives the transmission pole 52. The transmission pole 52 drives the transmission gear 53; the transmission gear 53 drives the ring gear 54; the ring gear 54 eccentrically disposed toward the work area W drives the driven gear 222 within the work area W; the driven gear 222 drives the connection set 32 in the tool holder 30 within the work area W. Thus, the tool holder 30 within the work area W is capable of rotating to various angles. At the same time, the driving motor 41 drives the gear set 42; the gear set 42 drives the driving pole 43; the driving pole 43 drives the bevel gear 433; the bevel gear 433 then drives the driving gear 33; the driving gear 33 drives the tool 31. Thus, the tool 31 within the work area is rotated to cut the workpiece from various angles.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A rotational power toolpost, comprising:
   a turret base including a protruding joint part and a bearing sleeved on the protruding joint part;
   a turret pivotally connected with the turret base through a pivot shaft that is pivotally connected with the protruding joint part of the turret base and eccentric to the bearing, and comprising a turret main body having a plurality of mounting holes on a side surface thereof; and a retaining ring having a plurality of driven gears corresponding to the mounting holes pivotally connected to a rim of the retaining ring; wherein the other ends of the driven gears are pivotally mounted into the mounting holes respectively;
   at least one tool holder inserted into the mounting hole, wherein each tool holder has at least one tool and a connection set engaged with the driven gear; and
   a tool-holder-rotating device mounted on the turret base and comprising a servomotor, a transmission pole, a transmission gear connected with the transmission pole, and a ring gear engaged with the transmission gear, the bearing of the turret base fitted into the ring gear; wherein the transmission pole connects with the servomotor and is inserted into the turret; and the eccentrically disposed ring gear engages with and drives one of the driven gear; the driven gear drives the connection set in the tool holder, thereby rotating the tool holder.

2. The toolpost as claimed in claim 1, wherein the connection set comprises a connection gear set, a worm engaged with the gear set, and a worm wheel fixed on the tool holder; the driven gears drive the connection gear set; the connection gear set drives the worm; the worm drives the worm wheel, thereby rotating the tool holder.

3. The toolpost as claimed in claim 1, further comprising a tool-rotating device; wherein each tool holder comprises a driving gear connected with the tool; wherein the tool-rotating device connects with the driving gear, thereby rotating the tool.

4. The toolpost as claimed in claim 3, wherein the tool-rotating device comprises a driving motor, a tool-rotating gear set connected with the driving motor, and a driving pole connected with the tool-rotating gear set, the driving pole is inserted into the turret and connected with a bevel gear engaged with the driving gear, thereby rotating the tool.

* * * * *